United States Patent [19]

Jones

[11] Patent Number: 4,927,174
[45] Date of Patent: May 22, 1990

[54] STEERING COLUMN COUPLING

[75] Inventor: Bryan Jones, Chelmsford, England

[73] Assignee: Ford Motor Company, Dearborn, Mich.

[21] Appl. No.: 278,907

[22] Filed: Dec. 2, 1988

[30] Foreign Application Priority Data

Dec. 4, 1987 [GB] United Kingdom ............... 8728414

[51] Int. Cl.$^5$ ............................................. B62D 1/18
[52] U.S. Cl. ..................................... 280/777; 280/779; 403/303
[58] Field of Search ................. 280/777, 779; 403/383

[56] References Cited

U.S. PATENT DOCUMENTS 3,867,050  2/1975  Pitner .................................. 403/383

FOREIGN PATENT DOCUMENTS 1223828  3/1971  United Kingdom .

OTHER PUBLICATIONS

1987 Taurus/Sable Shop Manual, p. 13-04-2.

Primary Examiner—Kenneth R. Rice
Attorney, Agent, or Firm—Jerome R. Drouillard; Roger L. May

[57] ABSTRACT

A steering column coupling for a motor vehicle has a pivoted link which swings onto a stub shaft from the steering gear. The link has one open side through which the shaft enters, and a captive bolt which can be slid along the link to close the open side once the shaft has been positioned.

10 Claims, 2 Drawing Sheets

# STEERING COLUMN COUPLING

FIELD OF THE INVENTION

1. Background of the Invention

This invention relates to a steering column coupling for use in a motor vehicle to facilitate the assembly of a steering column shaft into the vehicle.

2. Description of Related Art

Conventionally, with rack and pinion steering, the steering rack is mounted in the engine compartment, with a pinion shaft, which drives the steering rack, projecting through a bulkhead into the passenger compartment. The lower end of the steering shaft is then connected to the pinion shaft. Other types of steering gears may have a similar shaft projecting into the bulkhead, and in this specification, the pinion shaft, or its equivalent, will be referred to as a stub shaft.

It is known to form the mating ends of the stub shaft and of the steering shaft with telescopically engaging splined portions, but this requires that the two be assembled by relative axial movement, which is not always easy in the confined space where engagement has to occur. Particular difficulties arise where the steering shaft is a three-link design, as it is then difficult to support the remainder of the column while engaging the splined ends.

It is also known, from Great Britain Patent Specification No. 1,223,828, to use a pivoted link with a V-shaped bed in which the stub shaft can be non-rotatably secured. This avoids the need for the mating ends to approach one another in a purely axial direction, but requires the fitting of a gate to close the V-shaped bed once the stub shaft has been located. A similar design is shown in Ford Motor Company Shop Manual for 1987 model Taurus and Sable automobiles at p. 13-04-2. Each of these designs suffers from the common drawback that it is necessary to add loose parts to the coupling to complete the attachment process, and this must be done in a location within the vehicle which is not readily accessible.

It is an object of the present invention to provide a steering column coupling which obviates the need for additional loose fasteners or other components.

It is an advantage of a coupling according to the present invention that such a coupling is well suited for installation in spatially limited quarters.

SUMMARY OF THE INVENTION

According to the invention, there is provided a steering column coupling for coupling to a non-round stub shaft which is connected to a steering rack pinion and is adapted to be turned about a longitudinal axis to operate the steering rack, the coupling comprising a connection link pivoted to the lower end of a steering shaft, the link having a longitudinal recess with a cross section complementary to that of the stub shaft, the recess being open at one side to receive the shaft and the link including a bolt which can be tightened to clamp the shaft in the recess, with the bolt being arranged so that it is captive on the link but can slide longitudinally along the link between a first position where it does not obstruct the side opening of the recess, and a second position where it can be tightened to clamp the stub shaft in the recess.

A coupling of this type requires the tightening of one bolt only in order to properly secure the steering shaft to the stub shaft, and furthermore the bolt is retained captive on the column so it cannot be dropped during assembly.

Preferably, the bolt is constructed so that it cannot rotate once the stub shaft has been correctly positioned in the recess, and a nut fitted to the bolt can then be tightened with a single tool.

The recess for receiving the stub shaft can conveniently be a generally V-shaped channel which can be formed from a suitably folded metal plate. The two opposing flanks which define the open side of the recess can have parallel slots in them, and the bolt can pass through these slots and be longitudinally slidable in the slots. The slots may be parallel to the axis of the recess or may have two connected parallel regions at different distances from the centre of the slot, so that the bolt is directed towards the centre of the recess as it approaches one end of the slot.

The bolt can have a region between its ends which is non-round and which is arranged to locate against the stub shaft to prevent rotation of the bolt while a nut is being tightened on it. If the non-round region on the bolt is larger than the width of the slot where the bolt lies in its pinion-securing position, then even if the nut on the bolt should work loose, the stub and steering shafts will remain connected.

The bolt may have a tapered non-round region so that as a nut is tightened on the bolt, the shaft is forced tightly into the recess on the connecting link.

The bolt may be secured to a sleeve which can slide along the link between the first and second positions. The sleeve can have two spaced sides with the bolt extending between them. Tightening of a nut on the bolt then draws the two sides together to clamp the pinion. Alternatively, the sleeve may completely encircle the link and the bolt may be directed radially through a threaded bore on the sleeve and may be tightened directly against the stub shaft in the recess. In this case, no separate nut is required.

The invention also relates to a steering column arrangement in a motor vehicle where a steering column with a coupling as set forth above is connected to a stub shaft attached to a steering gear operating member, typically the pinion of a rack and pinion steering gear.

The invention will now be further described, by way of example, with reference to the accompanying drawings, in which.

DESCRIPTION OF THE PREFERRED EMBODIMENTS

Figure 1:
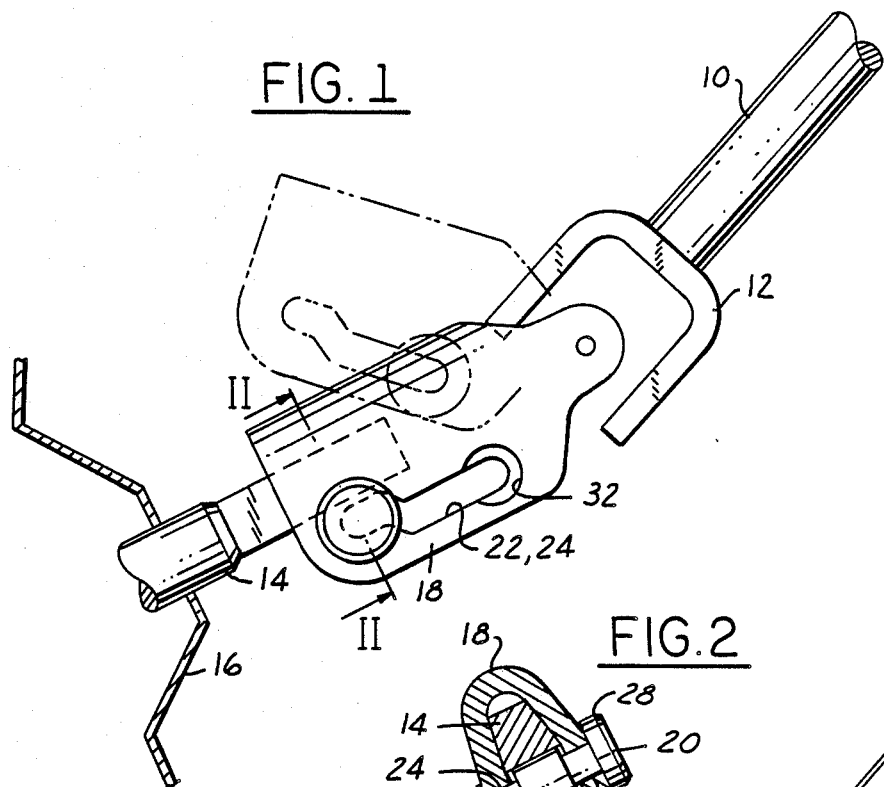
FIG. 1 is a side view of a first embodiment of a steering column coupling in accordance with the present invention.

FIG. 1 shows the lower end, 10, of a steering column ending in a fork, 12, and a stub shaft, 14, which projects through a bulkhead, 16, and is attached to a steering gear (not shown) on the other side of the bulkhead.

Figure 2:
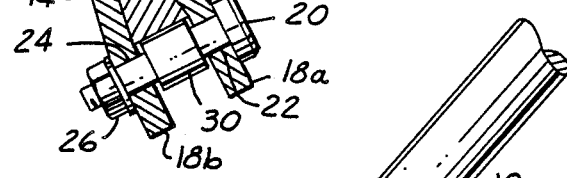
FIG. 2 is a cross section through the coupling of FIG. 1 on the line II—II.

A link, 18 is connected to fork 12 at the lower end of the steering column driveshaft, through a conventional universal joint (not shown). As can be seen in FIG. 2, link 18 is formed from sheet metal bent to form a V-shaped channel, and the stub shaft end 14 (which has a complementary shape) fits into the recess.

The two sides 18a and 18b of link 18 are connected by a bolt, 20, which passes through slots 22 and 24 and which carries nut 26. Bolt 20 has a head, 28, and an enlarged center, 30, which is non-round. Neither the head nor the enlarged center can pass through the slot 22, but at one end slot 22 has an opening, 32, through which the bolt can be assembled to the link.

Slots 22 and 24 have a dog-leg shape so that most of the longitudinal sliding movement is carried out away from the position of the shaft 14. It is just in the final part of this movement that bolt 20 approaches the stub shaft and the non-round portion 30 jams against the shaft so that bolt is held against rotation, to permit nut 26 to be tightened. It will, however, be apparent from the dispositions of all the parts that if the nut 26 should work loose or even fall off bolt 20, the bolt will still secure shaft 14 and link 18 together and enable steering efforts to be transmitted.

In use, bolt 20 is slid to the top end of the slots, nearest the bottom end of the column 10. The column is positioned in the vehicle and link 18 is positioned as shown by the chain-dotted lines in FIG. 1. Once the bottom end of the column and stub shaft 14 are correctly aligned, then link 18 is pivoted so as to locate on stub shaft 14. Bolt 20 is then slid along the slots 22, 24 to the lower ends of the slots, and is tightened there.

Figure 3:
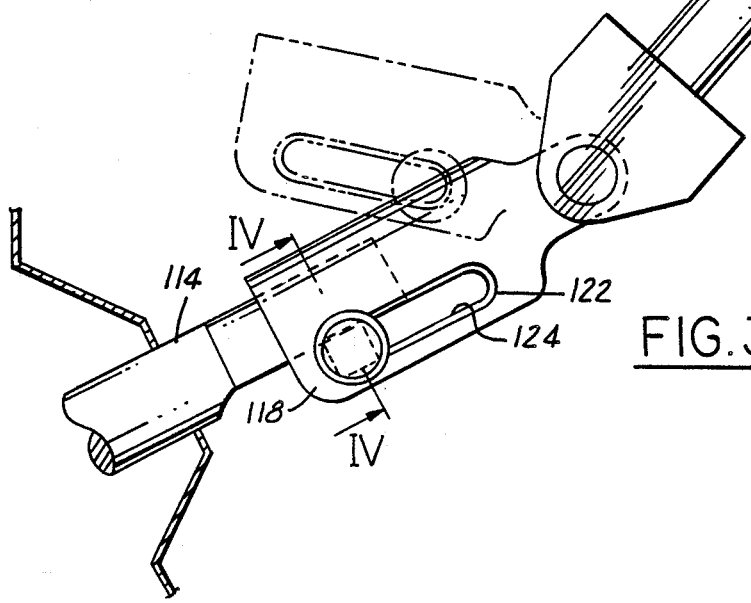
FIG. 3 is a side view of a second embodiment of a steering column coupling in accordance with the present invention.
Figure 5:
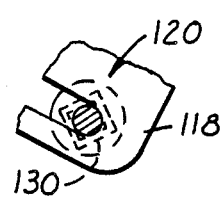
FIG. 5 is a section through the bolt of FIG. 4 on the line V—V.
Figure 4:
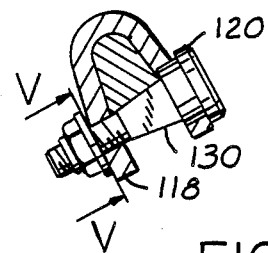
FIG. 4 is a cross section through the coupling of FIG. 3 on the line IV—IV.

FIGS. 3, 4 and 5 show an alternative arrangement where the slots 122, 124 are straight and where the bolt 120 has a tapering, square non-round portion 130. Slot 122 is wider than slot 124 to allow the bolt to be positioned. Because of the cross-sectionally asymmetric shape of stub shaft 114, tightening of the nut on the tapered bolt both squeezes the two sides of the link and also forces the stub shaft into the base of the V-shaped recess.

Figure 6:
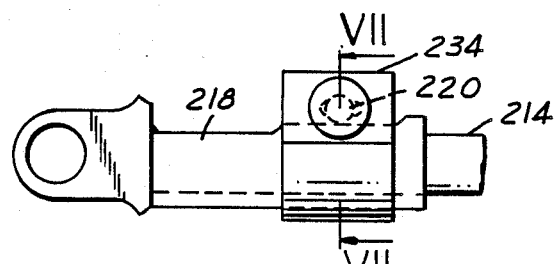
FIG. 6 is a side view of a third embodiment of a steering column coupling in accordance with the invention.
Figure 7:
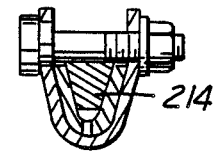
FIG. 7 is a cross section through the coupling of FIG. 6 on the line VII—VII.

FIGS. 6, 7, 8 and 9 show further alternative constructions. In FIGS. 6 and 7, a sleeve, 234, supports bolt 220 and slides along link 218 between two end positions. The non-round region of the bolt will prevent the bolt from turning by contacting either stub shaft 214 or the side walls of the link 218, or both.

Figure 8:
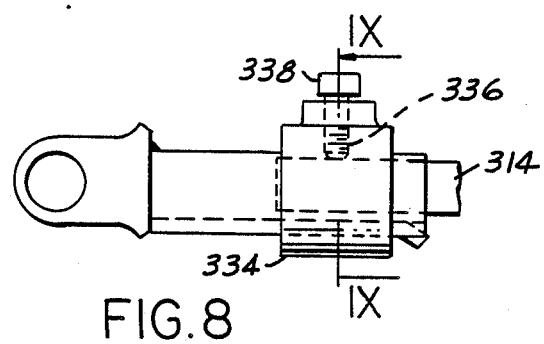
FIG. 8 is a side view of a fourth embodiment of a steering column coupling in accordance with the present invention.
Figure 9:
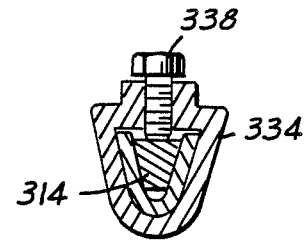
FIG. 9 is a cross section through the coupling of FIG. 8 on the line IX—IX.

In FIGS. 8 and 9, a sleeve, 334, has a tapped hole 336, and a set screw, 338. The sleeve is slidable along the link as in the embodiment of FIGS. 6 and 7, and once it is finally positioned, the screw is tightened against the stub shaft 314.

Using the constructions described herein, it is possible to secure the steering column/steering rack joint without having to position any loose small parts such as nuts and bolts in the cramped working area of a vehicle footwell. The column itself can be accurately positioned and secured before the joint is secured, and tightening of the joint to complete the securing process requires only one tool to torque up a nut on a bolt which is held fast against rotation.

In the embodiment of FIGS. 1 and 2 in particular, even if the nut 26 works loose, or falls off the joint will still stay secure.

The invention has thus been shown and described with reference to specific embodiments. However, it should be noted that the present invention is in no way limited to the details of the illustrated structure; changes and modifications may be made without departing from the scope of the appended claims.

I claim:

1. A steering column coupling for attaching a steering driveshaft to a non-round stub shaft which is connected to a steering rack operating member and is adapted to be turned about a longitudinal axis to operate the steering rack, the coupling comprising a connection link pivoted to the lower end of the steering shaft, the link having a longitudinal recess with a cross-section complementary to that of the stub shaft, the recess being open at one side to receive the stub shaft, and the link including a bolt which can be tightened to clamp the shaft in the recess, the bolt being arranged so that it is captive on the link but can slide longitudinally along the link between a first position where it does not obstruct the side opening of the recess, and a second position in contact with the stub shaft where it can be tightened to clamp the stub shaft in the recess.

2. A coupling as claimed in claim 1, wherein the bolt is constructed so that it cannot rotate once the stub shaft has been correctly positioned in the recess, so that a nut fitted to the bolt can be tightened with a single tool.

3. A coupling as claimed in claim 1, wherein the recess is a generally V-shaped channel.

4. A coupling as claimed in claim 3, wherein the recess is formed from a metal plate suitably folded.

5. A coupling as claimed in claim 1, wherein two opposing flanks which define the open side of the recess have parallel slots in them, so that the bolt can pass through these slots and be longitudinally slidable in the slots.

6. A coupling as claimed in claim 5, wherein the slots are straight and parallel to the axis of the recess.

7. A coupling as claimed in claim 5, wherein the slots have two connected parallel regions at different distances from the centre of the slot, so that the bolt is directed towards the centre of the recess as it approaches one end of the slot.

8. A coupling as claimed in claim 5, wherein the bolt can have a region between its ends which is non-round and which is arranged to locate against the shaft to prevent rotation of the bolt while a nut is being tightened on it.

9. A coupling as claimed in claim 8, wherein the non-round region on the bolt is larger than the width of the slot where the bolt lies in its shaft-securing position.

10. A coupling as claimed in claim 8, wherein the bolt has a tapered non-round region so that as a nut is tightened on the bolt, the shaft is forced tightly into the recess on the connecting link.

* * * * *